United States Patent [19]

Jones, Jr.

[11] Patent Number: 5,022,671
[45] Date of Patent: Jun. 11, 1991

[54] HAND PEDALLED TRICYCLE WITH IMPROVED STEERING

[76] Inventor: Allan B. Jones, Jr., 974 Pinson Blvd., Rockledge, Fla. 32955

[21] Appl. No.: 470,313

[22] Filed: Jan. 25, 1990

[51] Int. Cl.⁵ .............................. B62K 21/10
[52] U.S. Cl. .................. 280/250; 280/263; 280/271
[58] Field of Search ............ 280/250, 249, 250.1, 280/234, 263, 271, 89, 94

[56] References Cited

U.S. PATENT DOCUMENTS

| | | | |
|---|---|---|---|
| 627,639 | 6/1899 | Eames | 280/250 |
| 4,006,915 | 2/1977 | Parker | 280/271 |
| 4,108,460 | 8/1978 | Silva, Jr. | 280/271 |
| 4,695,071 | 9/1987 | Johnston | 280/250 |
| 4,720,117 | 1/1988 | Hay | 280/250 |

Primary Examiner—Mitchell J. Hill
Attorney, Agent, or Firm—Macdonald J. Wiggins

[57] ABSTRACT

A hand propelled tricycle has a hand-operated crank assembly mounted to an upper end of a front fork stem coupled to a front wheel supported by the fork. The fork is straight without caster and a set of springs attached between the fork and a tricycle frame provides centering of the front wheel. A pair of spaced-apart wheels is mounted to an axle at the rear of the frame.

8 Claims, 1 Drawing Sheet

HAND PEDALLED TRICYCLE WITH IMPROVED STEERING

BACKGROUND OF THE INVENTION

1. Field of the Invention

The present invention relates to to a handpowered tricycle for disabled persons, and more particularly to a tricycle having a stable steering mechanism which is easily steered without ceasing propulsion of the vehicle.

2. Description of the Prior Art

Tricycle devices are well known in the art that are suitable for paraplegic persons and the like which are propelled by hand and arm power. Such devices are disclosed in the following U.S. Pat. Nos.: 3,485,510 to Merlan; No. 3,848,891 to Vittori; No. 4,109,927 to Harper; No. 4,152,005 to Vanore; No. 4,316,616 to Boivin; No. 4,471,972 to Young; No. 4,502,705 to Weaver; No. 4,659,071 to Johnston; and No. 4,720,117. Problems encountered with such devices stem from the various steering mechanisms. Many use conventional bicycle-type castered front wheels which cause the vehicle to be lifted when the wheel is turned since the weight of the user and vehicle provides the centering force. Others use tiller steering which may force the user to cease or reduce operation of the propelling mechanism when turning.

There is a need for a hand-operated tricycle vehicle in which these problems do not exist.

SUMMARY OF THE INVENTION

The present invention is a hand operated tricycle in which the front wheel is driven by a chain and sprocket. A hand operated crank and sprocket is mounted to the upper end of the front wheel fork stem for driving the chain. The fork is straight without caster. To provide a restoring force when turning, a lateral crossbar is attached to an upper end of the fork with a tension spring connected from each end to the vehicle frame. A safety cable is connected across each spring to limit the degree of rotation of the front wheel.

The vehicle frame is open at the front to provide clearance for the chain drive over the turning limits. A pair of wheels is mounted to the rear end of the vehicle frame. A formed fiberglass or plastic seat, mounted on a swivel, is attached to the frame between the rear wheels.

As may now be recognized, the invention provides a tricycle in which the steering column rotates to steer with minimum lifting of the vehicle, providing a small turning radius and permitting driving power to the front wheel be continuously maintained during turning. The driver may lean into the curve and maintain a low center of gravity when turning at relatively high speed. This action contrasts with prior art designs utilizing tiller steering that force a shift of the center of gravity toward the outside of the curve, producing a tendency to flip over.

It is therefore a principal object of the invention to provide a three wheel vehicle having a hand driven front wheel with improved stability, a small turning radius, and which permits power to the front wheel to be maintained during turning.

It is another object of the invention to provide a three wheel vehicle in which the front fork has no caster.

It is still another object of the invention to provide a a three wheel vehicle in which springs are used to provide restoring force after turning.

It is yet another object of the invention to provide a three wheel vehicle in which a low center of gravity may be maintained during turns at relatively high speed.

It is another object of the invention to provide steering by rotating the front fork by lateral pressure on hand crank while the crank is continuously rotated for propulsion.

These and other objects and advantages will become apparent from the following detailed description when read in conjunction with the drawings.

DETAILED DESCRIPTION OF THE PREFERRED EMBODIMENT

Figure 1:
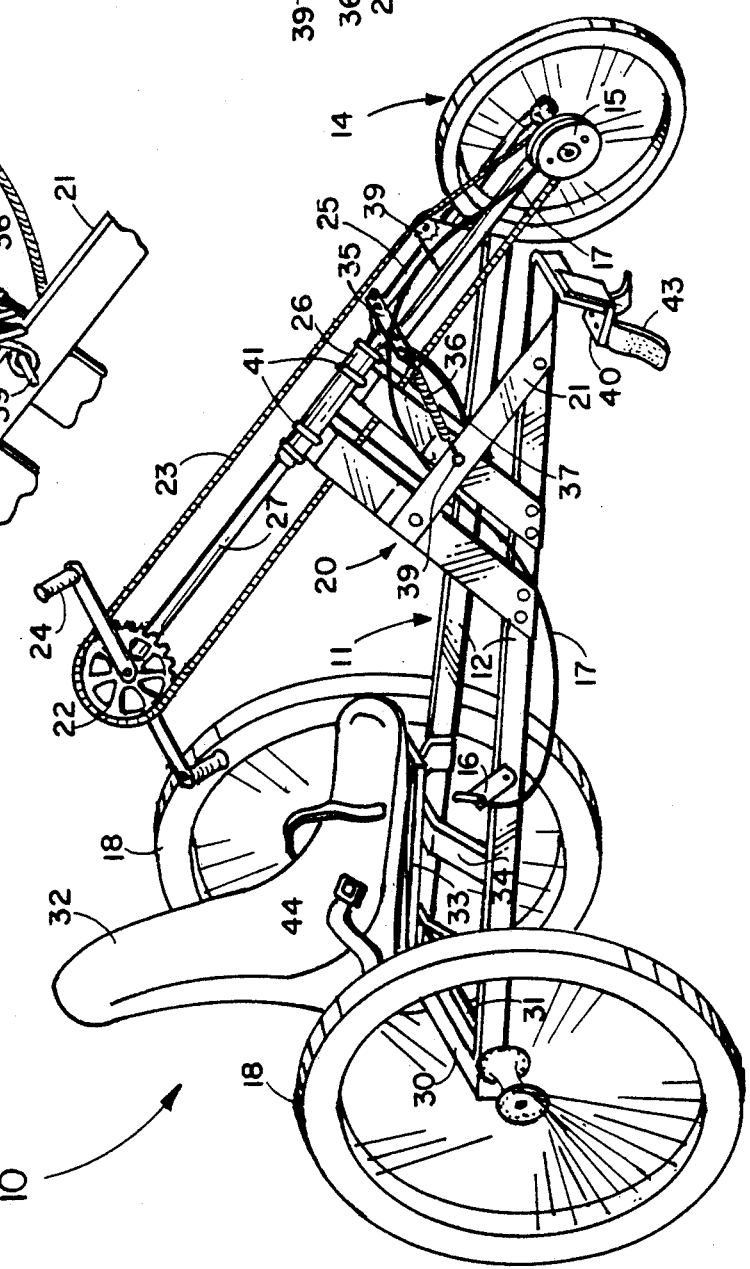
FIG. 1 is a perspective view of a preferred implementation of the three wheeled vehicle of the invention.

Referring first to FIG. 1, a perspective view of the preferred embodiment of a three wheel vehicle 10 in accordance with the invention. A frame 11 includes a pair of longitudinal elements 12, a cross piece 30 at the rear and a fork support structure shown generally at 20. The frame 11 may be constructed from aluminum to minimize weight, although other suitable materials may be used. As will be noted, frame 11 is open at the forward end and includes a pair of foot rests 40 having straps 43 using hook and loop fasteners, such as Velcro ®.

At the rear of frame 11, a pair of spoked wheels 18 is mounted to axle 31. A seat 32 may be molded of fiberglass, plastic, or similar material and mounted on a rotatable platform 33 for ease of entering and leaving the vehicle. Brackets 34 support platform 33 on frame 11. Seat 32 preferably includes a seat belt 44 for the safety of the occupant.

A front wheel 14 is driven by sprocket assembly 15 which is preferably a conventional three speed bicycle type. Gear shift handle 16 operates a multi-speed gear assembly 15 via cable 17. Wheel 14 is mounted in fork 25 having a stem 27 pivoted in fork head 26. Fork head 26 is attached to fork support 20 by U-bolts 41. As will be noted, fork 25 and stem 27 are straight and in line with the axle of sprocket assembly 15. A drive sprocket 22 is pivotally mounted at the upper end of fork stem 27. Sprocket 22 is operated by a pair of crank arms 24 which includes handles for manual operation thereof. A drive chain 23 extends from drive sprocket 22 to sprocket assembly 15. An idler sprocket 39 is mounted to fork 25 to permit adjustment of the tension of chain 23. As will be noted from FIGS. 1 and 2, fork support 20 has spaced apart side elements to permit drive chain 23 to pass under fork 25, fork head 26, and stem 27 without interference to chain 23 during steering.

Figure 3:
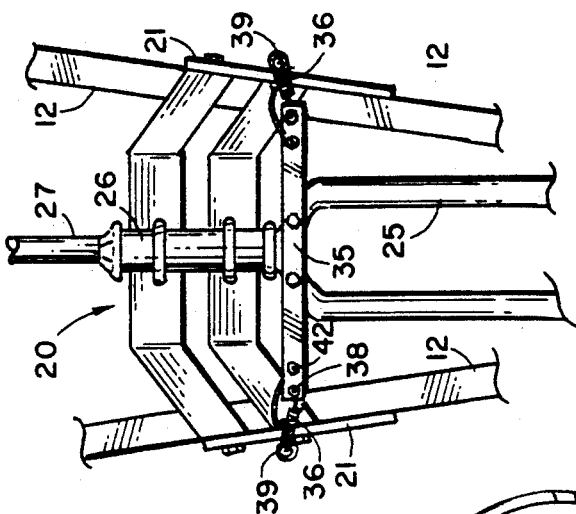
FIG. 3 is a partial top view of the vehicle frame and front fork showing the steering restoring spring arrangement.
Figure 2:
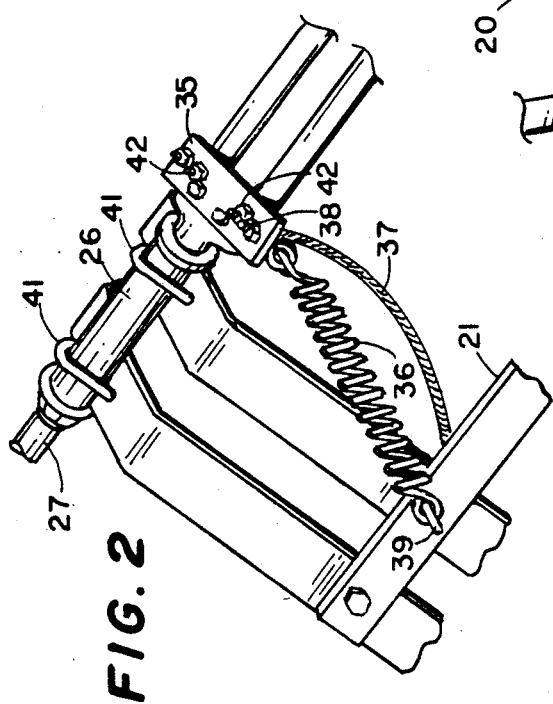
FIG. 2 is a partial view of the vehicle frame and front fork of the vehicle of FIG. 1 showing the one of the steering restoring springs.

Details of a front wheel centering system are shown in FIGS. 2 and 3. A crossbar 35 is mounted to an upper portion of fork 25. An eyebolt and lock nuts 38 are mounted at each outer end of crossbar 35. An eyebolt 39 is disposed at the intersection of angle brace 21 and fork mount 20 on each side thereof. A tension spring 36 is attached between each eyebolt 39 on fork support 20 and eyebolt 38 on fork crossbar 35 for maintaining front wheel 14 centered. Centering adjustment and spring tension adjustment are made by means of eyebolts 38. A short cable 37 of steel or the like is connected across each spring 36, from eyebolt 42 on crossbar 35 to the inner end of eyebolt 39, to limit the degree of turning of fork 25 to a safe amount. Caliper type brakes (not shown) may be provided.

In operating the three wheel vehicle 10, the user grasps and rotates crank arms 24 to move forward. To turn, fork stem 27 and fork 25 are rotated by producing a torque against the tension of the spring 36 on the outside of the turn by a rotary pressure on the crank handles as cranking is continued. Pretensioning of springs 36 controls the turning effort and returns the fork to the center position when a turn is complete. Since the frame 11 is not raised during a turn, there is no change in the center of gravity of vehicle and driver.

Although the invention has been described with reference to the preferred embodiment, many changes in structural details may be made thereto without departing from the spirit and scope of the invention.

I claim:

1. A hand operated tricycle comprising:
   an essentially horizontal frame;
   a straight fork assembly rotatably mounted to a front end of said frame;
   a front wheel supported by said fork assembly;
   a hand crank mounted at an upper end of said fork assembly and operatively connected to said front wheel for propelling said tricycle, said hand crank also for rotating said fork assembly to steer said tricycle;
   a pair of tension springs attached between said fork assembly and said frame for maintaining said fork assembly centered with respect to a longitudinal axis of said frame;
   a cable attached across each of said tension springs for limiting the degree of rotation of said fork assembly; and
   a rear axle attached at a rear end of same frame at right angles to said longitudinal axis, said axle supporting a wheel at each outer end thereof.

2. The tricycle as defined in claim 1 which further comprises a seat disposed on said frame.

3. The tricycle as defined in claim 2 which further comprises a seat belt attached to said seat, and foot rests attached at a forward end of said frame.

4. A hand-propelled three wheel vehicle comprising:
   a) an essentially horizontal frame;
   b) a pair of spaced apart wheels mounted on an axle and disposed at a rear end of said frame;
   c) a fork support frame mounted at a forward end of same frame having spaced apart side elements;
   d) a straight fork rotatably mounted through a fork head, said fork head mounted to said fork support frame, said fork supporting a front wheel at its lower end wherein the axis of said fork and fork head slopes rearwardly from said front wheel;
   e) a straight stem attached to said fork, said stem supporting a drive sprocket at its distal end, and a crank arm assembly having a pair of handles, said assembly operatively attached to said sprocket whereby said tricycle is steered by rotating said stem and fork with said crank arm assembly;
   f) drive chain means disposed between said sprocket and said front wheel, said chain having a lower portion thereof passing through said spaced apart side elements of said fork support frame;
   g) spring centering means for maintaining said front wheel aligned along a longitudinal axis of said frame; and
   h) seating means mounted at a rear end of said frame.

5. The vehicle as defined in claim 4 in which said spring centering means comprises:
   a) a cross bar attached across said fork;
   b) a first tension spring having a first end thereof attached to one outer end of said cross bar, and a second end thereof attached to said fork support frame; and
   c) a second tension spring having a first end thereof attached to the other end of said cross bar, and a second end thereof attached to said fork support frame; the tensions of said first and second springs adjusted to center said front wheel with respect to said longitudinal axis, said first and second springs each having a cable connected thereacross for limiting the degree of rotation of said fork.

6. A drive and steering system for a tricycle comprising:
   a tricycle frame and fork assembly having a pair of rear wheels and a front wheel;
   a straight rotatable fork and fork stem, said fork supporting said front wheel;
   a hand crank having a pair of crank handles attached to an upper end of said fork stem, said crank handles for driving and steering said tricycle;
   a crank sprocket driven by said hand crank;
   a drive sprocket assembly attached to said front wheel;
   a drive chain connected between said crank sprocket and said drive sprocket assembly;
   a cross bar attached laterally across said fork; and
   a pair of tension springs, one of said springs attached from each end of said cross bar to respective sides of said tricycle frame, said springs serving to maintain said front wheel centered.

7. The system as defined in claim 6 in which said drive sprocket assembly is a multi-speed type.

8. The system as defined in claim 6 which further comprises a cable attached across each of said tension springs for limiting the degree of rotation of said fork.

* * * * *